United States Patent
Chiang et al.

[11] Patent Number: 5,897,772
[45] Date of Patent: Apr. 27, 1999

[54] MULTI-STAGE FLOTATION COLUMN

[76] Inventors: Shiao-Hung Chiang, 5435 Hobart St., Pittsburgh, Pa. 15217; Daxin He, 13333 Hunter Rd., Apt. #23, Verona, Pa. 15147; Fuxin Ding, Chemical Engineering Department, Tsinghua University, Beijing, China, 100084

[21] Appl. No.: 08/763,904

[22] Filed: Dec. 11, 1996

Related U.S. Application Data

[60] Provisional application No. 60/009,211, Dec. 22, 1995.

[51] Int. Cl.[6] .............................. C02F 1/24; B03D 1/24; B01D 17/035
[52] U.S. Cl. ................... 210/221.2; 210/194; 210/195.1; 210/322; 210/262; 210/320; 209/170
[58] Field of Search .................................... 209/168, 169, 209/170; 210/221.1, 221.2, 194, 195.1, 322, 262, 320; 162/4

[56] References Cited

U.S. PATENT DOCUMENTS

| | | |
|---|---|---|
| 1,526,997 | 2/1925 | Malmros . |
| 3,298,519 | 1/1967 | Hollingsworth . |
| 3,393,803 | 7/1968 | Daman . |
| 3,972,815 | 8/1976 | O'Cheskey . |
| 4,431,531 | 2/1984 | Hollingsworth . |
| 4,592,834 | 6/1986 | Yang . |
| 4,783,268 | 11/1988 | Leung . |
| 4,804,460 | 2/1989 | Moys et al. . |
| 4,851,036 | 7/1989 | Anthes . |
| 4,938,865 | 7/1990 | Jameson . |
| 4,940,534 | 7/1990 | Harrison . |
| 4,966,687 | 10/1990 | Trigg . |
| 4,971,731 | 11/1990 | Zipperian . |
| 4,981,582 | 1/1991 | Yoon et al. . |
| 5,078,921 | 1/1992 | Zipperian . |
| 5,096,572 | 3/1992 | Hwang . |
| 5,116,487 | 5/1992 | Parekh et al. . |
| 5,122,261 | 6/1992 | Hollingsworth . |
| 5,167,798 | 12/1992 | Yoon . |
| 5,249,668 | 10/1993 | Hwang . |
| 5,294,003 | 3/1994 | Hollingsworth . |
| 5,543,043 | 8/1996 | Bates . |
| 5,580,463 | 12/1996 | Hubred . |

FOREIGN PATENT DOCUMENTS 1478555  7/1977  United Kingdom .

OTHER PUBLICATIONS

Ding and Chiang, "Removal of Oil from Oily Waste Water Using Multi–Stage Loop Flotation Column", Fluid/Particle Separation Journal vol. 7 #4, Dec. 1994.

*Primary Examiner*—Thomas M. Lithgow
*Attorney, Agent, or Firm*—J. Stewart Brams

[57] ABSTRACT

An apparatus and method are disclosed for environmental applications such as waste water treatment, de-inking of recycled paper, chemical/biochemical waste clean-up, and mineral beneficiation, using a multi-stage flotation column. A series of draft tubes arranged axially and separated by baffles provides individual mixing stages in the flotation column and a special gas distributor generates fine gas bubbles. The draft tubes create repetitive loop flow of the feed fluid in each flotation stage. This provides uniform distribution of the gas bubbles throughout the column and significantly enhances mixing and contacts of the gas bubbles with the impurities to be removed.

22 Claims, 3 Drawing Sheets

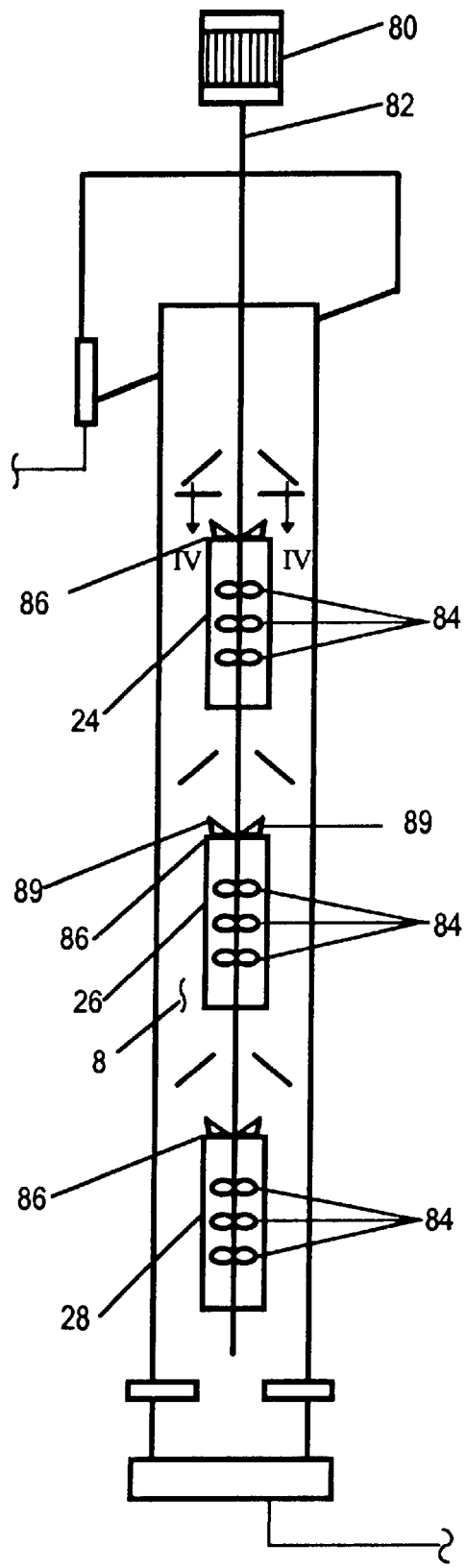
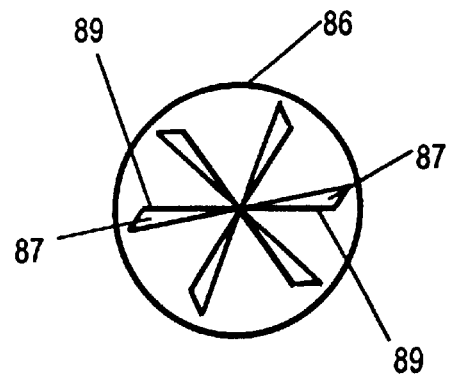
Figure 3
Figure 4

MULTI-STAGE FLOTATION COLUMN

This application claims the benefit of prior copending provisional application No. 60/009,211, filed Dec. 22, 1995, for its effective filing date and all other applicable purposes.

BACKGROUND OF THE INVENTION

1. Field of the Invention

This invention relates to froth flotation, including a froth flotation column consisting of a plurality of stages.

2. Description of the Prior art

Froth flotation has been used for many years for beneficiating mineral materials, and more recently for waste water treatment. Generally, in a flotation process solid particles or liquid droplets such as oil are separated from pulp or an aqueous phase. The flotation process includes generating gas bubbles and dispersing them in the pulp or aqueous phase to be treated. The gas bubbles contact and capture suspended particles or droplets in the pulp or aqueous phase. Due to the buoyancy of the gas bubbles, the gas bubbles with captured particles or droplets rise into a froth layer which floats on the surface of the pulp or aqueous phase. The froth layer is removed by an overflow skimming process.

In typical operations of conventional froth flotation devices, a single unit vessel is used for aerating the pulp and for effecting separation of froth. Generally, mechanical mixing is required which is energy intensive. The overall separation efficiency of the conventional single unit flotation device is inherently limited because it is difficult to optimize the mixing and contacting between the gas bubbles and the suspended fine droplets or solid particles.

Flotation columns are more efficient and economical than the conventional mechanical flotation devices. The main advantages of the flotation column include improved overall separation efficiency, simple construction and lower operating costs; however, even flotation columns may not be sufficiently efficient for all waste separation or treatment operations. For example, conventional froth flotation apparatus, including flotation columns, are not efficient for separating very fine solid particles or treating emulsified oily waste water. Therefore, there remains a need for an effective and low cost flotation device for waste water treatment and fine mineral beneficiation. An article entitled "Flow in Froth Zone of a Flotation Column" in the Canadian Metallurgical Quarterly, Volume 29, No. 2, April–June, 1990, pp. 97–103, indicated that in recent years many industries are replacing their conventional machines with flotation columns.

Column flotation apparatus is disclosed in a number of issued patents, including the following: U.S. Pat. Nos. 4,592,834, 4,804,460, 4,938,865, 4,940,534, 4,966,687, 4,971,731, 5,078,921, 5,116,487, 5,122,261, 5,167,798, 4,981,582, 5,249,668 and 5,096,572.

SUMMARY OF THE INVENTION

Many types of froth flotation apparatus have been proposed for waste water treatment and for separating fine particles suspended in a liquid/slurry feed. Generally, froth flotation gas bubbles are first formed through a sparger and then enter the pulp or solution. The gas bubbles contact and combine with the contaminant liquid droplets or suspended fine particles, and the resulting gas bubble-droplet or gas bubble-particle combinations rise to the top of the flotation chamber where they are entrapped in the froth layer. The froth laden with the contaminant liquid droplets or fine particles is then removed.

Treatment of waste water remains a very difficult problem in many industries, for example oil fields, as waste water must be cleaned prior to disposal. This is particularly true when very fine-size droplets or particles are present in the water. There is a pressing need in particular to develop an improved flotation column suitable for effective waste water treatment and fine mineral beneficiation.

This invention relates to a flotation column apparatus with the flotation chamber consisting of several stages for improved overall separation efficiency. The invention also relates to a flotation column in which several draft tubes are employed. In addition, the invention further relates to a flotation column in which a special gas sparger, made of porous metal tubing for example, is mounted at the bottom of the flotation column.

Accordingly, it is one object of the present invention to provide a multi-stage flotation column in which a draft tube is installed in each stage. The draft tubes create a rapid, repetitive loop flow of the feed liquid in each stage during flotation. This leads to uniform distribution of the fine gas bubbles throughout the mass of feed liquid in the flotation chamber, with resulting significantly enhanced mixing and contact of gas bubbles with entrained droplets and/or fine suspended solid particles.

A further object of the invention is to provide an improved sparger to create gas bubbles for a froth flotation column wherein the bubbles are finer in size than those generated by conventional spargers.

A specific object of the invention is to provide an improved froth flotation apparatus for treating waste water containing contaminants such as emulsified oil and/or suspended fine solids.

The above and other objects, features and advantages of the invention will be more fully understood from the following detailed description of the preferred embodiments, and the accompanying drawings, in which:

FIG. 3 is a schematic illustration of an alternative embodiment of the invention; and FIG. 4 is a top plan view taken on line IV—IV of FIG. 3.

DESCRIPTION OF THE PREFERRED EMBODIMENTS

Most waste water contains emulsified oil or contaminant liquid droplets and/or fine suspended solids of only a few microns in diameter. Removal of such contaminants from water is facilitated by the invention, which provides an efficient and economic apparatus and process based on the principle of froth flotation for removing liquid and particle contaminants from a wide variety of waste water and fine mineral suspensions.

Figure 1:
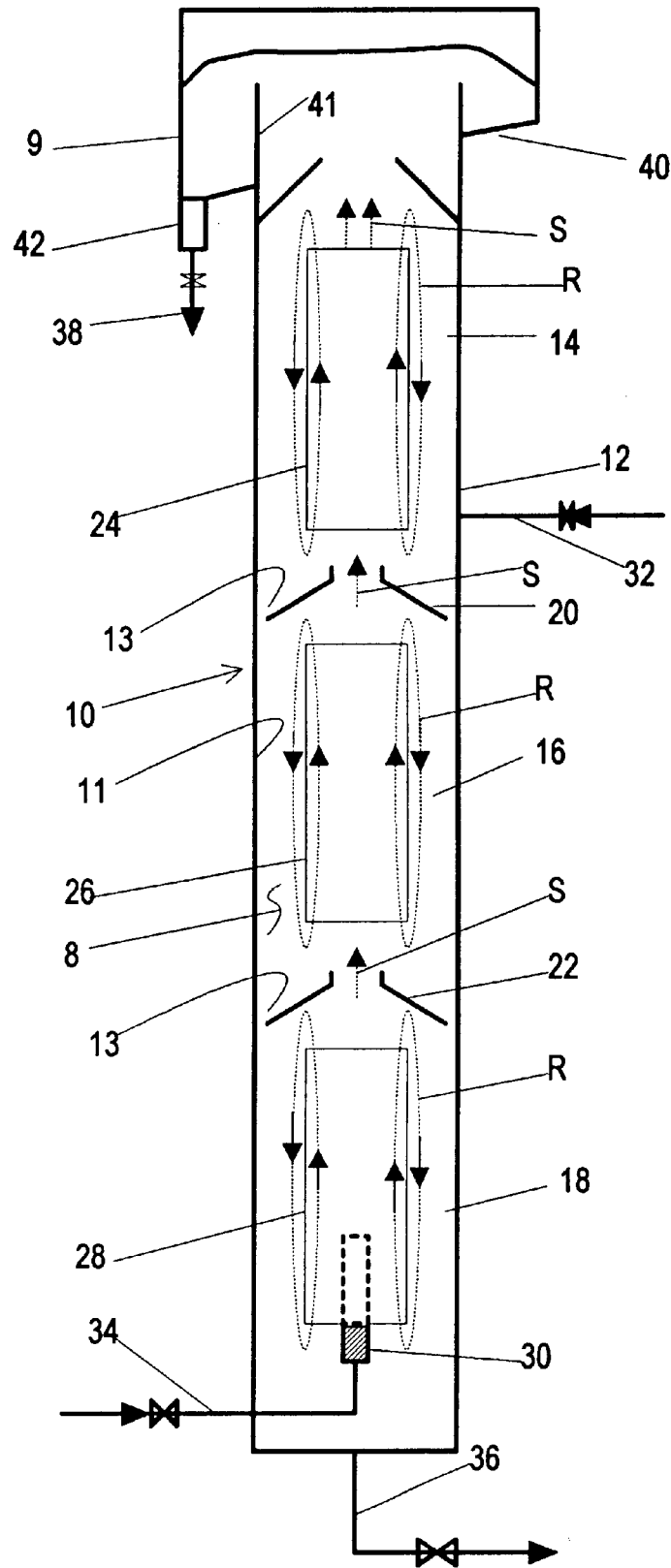
FIG. 1 is a schematic illustration of a multi-stage loop flotation column of the present invention.
Figure 2:
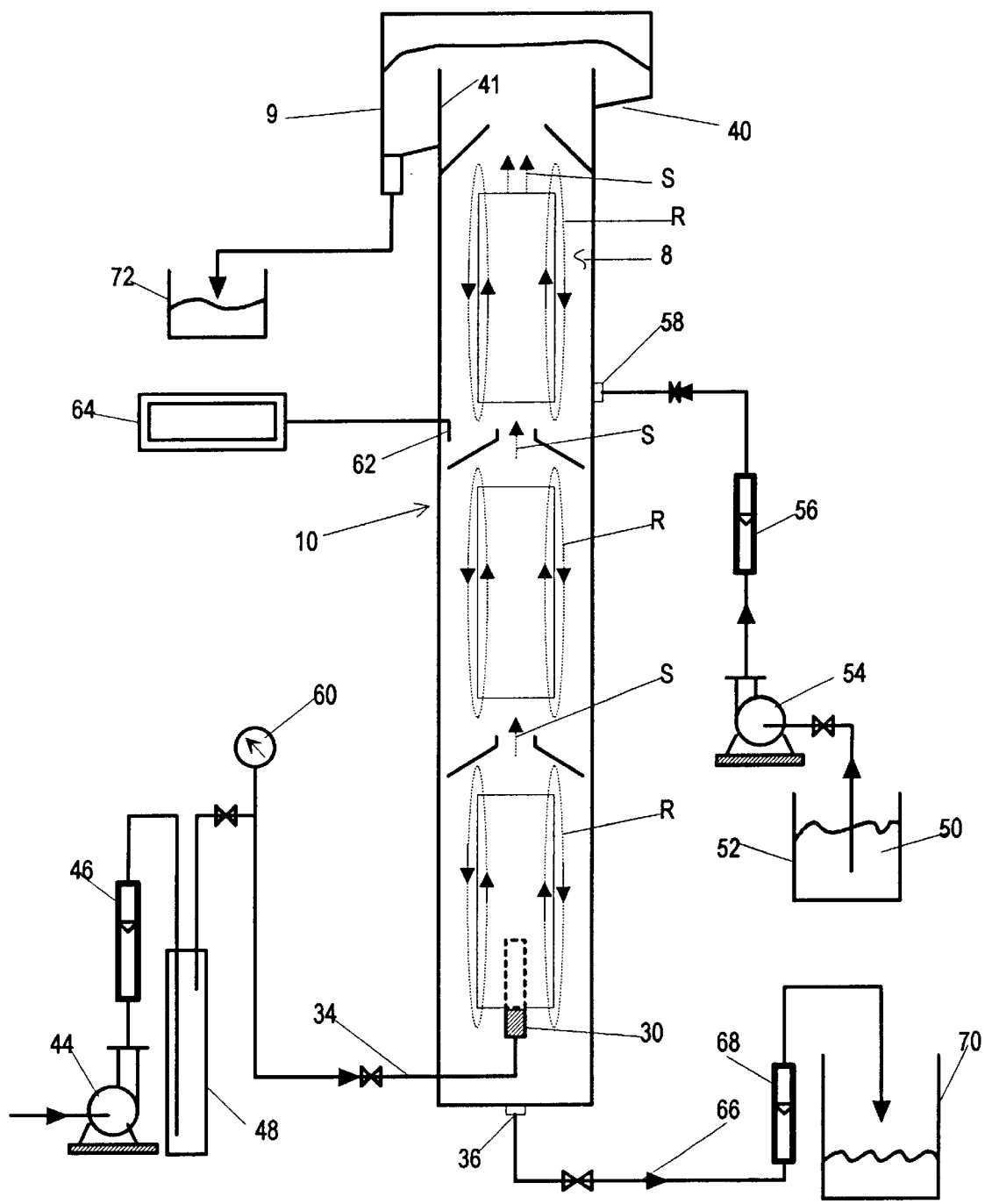
FIG. 2 is a simplified schematic flow diagram of one embodiment of the invention showing operation of the system for waste water treatment or mineral beneficiation.

With reference to FIGS. 1 and 2, a flotation column 10 is shown. Detailed description of the many conventional features of flotation columns is believed to be unnecessary for an understanding of the present invention. U.S. Pat. Nos. 4,592,834 and 4,804,460, the disclosures of which are hereby incorporated herein and made a part hereof by reference, include detailed description of such conventional flotation column features.

Flotation column 10 consists of an elongated flotation chamber 8 and an over-flow froth launder 9 adjacent an upper end of chamber 8. The flotation chamber 8 is formed within a generally cylindrical, elongated vessel 12 which is divided into axially arranged stages 14, 16 and 18, with intervening baffles 20 and 22. The baffles 20 and 22 may be generally cone-shaped, as shown, and suitably mounted on an inner wall 11 of vessel 12. A space 13 is provided between the outer extremity of baffles 20 and 22, and the adjacent inner wall 11 of vessel 12 to permit feed material to flow downward within the flotation column along wall 11 to the bottom of the column 10.

In each stage 14, 16 and 18, a respective cylindrical draft tube 24, 26 and 28, is coaxially oriented and suitably retained. Draft tubes 24, 26 and 28 have open top and bottom ends as shown. The ratio of the draft tube diameter to the inner diameter of chamber 8 can be varied within a range of approximately 0.4 to 0.9, or more preferably a range of approximately 0.2 to 0.9, to achieve optimal fluid flow characteristics. The arrangement of draft tubes within the respective stages of the flotation column as described provides for repetitive loop flow of the material being processed within the flotation column, as generally indicated by R in the figures.

A sparger 30 is preferably made of any suitable material such as sintered porous metal or polymer with a pore size in the range of 5 to 25 microns, preferably about 10 microns, to produce gas bubbles in a size range of about 20 to 500 microns diameter. The sparger 30 is centrally mounted near the bottom of chamber 8. The porous structure of the sparger allows air or other suitable gas to be forced through the pores of the sparger and into the mass of feed material surrounding the sparger whereby, from the outset very fine gas bubbles are introduced into the feed material.

A gas feed 34 supplies gas to sparger 30 and is one of two input streams to the system, the other being a liquid/slurry feed 32. Two output streams are also provided for the system, a clean water output 36 and a foam or froth overflow 38. The overflow 38 is disposed in froth launder 9 which has an inclined bottom plate 40 extending circumferentially around a top portion 41 of chamber 8. Bottom plate 40 collects foam or froth which overflows the upper end of flotation chamber 8. The froth thus is delivered by gravity to a foam outlet 42 located at the lowest elevation of bottom plate 40 for foam discharge as indicated at 38.

FIG. 2 illustrates schematically a system for performing the froth flotation process in the multi-stage flotation column of this invention. An air line supplies air or other suitable gas from a blower 44 to sparger 30 through a gas rotometer 46 and a humidifier 48. A suitable feed solution 50 contained in a feed tank 52 is introduced into the flotation chamber 8 by a feed pump 54 which pumps the solution 50 through a liquid rotometer 56 and an inlet port 58 in the upper stage 14 of chamber 8. A pressure gauge 60 measures the pressure drop through the chamber 8, while system temperature is measured by a thermocouple 62 and a digital meter 64. The clean water outlet 36 is located at the bottom of chamber 8 and is coupled to a clean water outlet pipe 66, liquid rotometer 68 and clean water discharge container 70. Overflow froth from the over-flow froth launder 9 is collected in a froth collection tank 72.

The specific flow characteristics within the described multi-stage flotation column are such that two distinct zones are formed during the flotation process, namely a bubbly zone and a froth zone. In the bubbly zone, which extends essentially throughout stages 14, 16 and 18 (see FIG. 1), the fine gas bubbles from sparger 30 are mixed with the liquid feed. This mixture repeatedly circulates around the draft tubes as indicated by R in each stage of chamber 8 to capture oil droplets and/or suspended particles.

The bubble-droplet or bubble-particle combinations then rise up through stages 18 and 16 and ultimately through stage 14 and into the froth layer near the top of chamber 8, as indicated by S. In each stage 14 and 16, the bubble-droplet or bubble-particle combinations entering the stage may repeat the circulating flow pattern R before exiting the respective stage 14 or 16. This flow pattern effectively creates an improved dispersion of the fine gas bubbles throughout the liquid phase and enhances the probability of fine gas bubbles attaching to and capturing contaminant liquid droplets and/or fine particles, thus leading to improved separation efficiency.

The multi-stage column of this invention can be operated in two different operating modes: batch operation or continuous operation. In batch operation, the total separation efficiency depends upon the flotation duration, while in continuous operation efficiency depends on liquid phase residence time.

The apparatus of this invention possesses significant advantages over conventional flotation machines and columns. The multi-stage design significantly improves removal of contaminant liquid droplets and/or suspended solid particles from water. The loop flow of fine gas bubbles, created by use of a draft tube installed coaxially within each stage, provides enhanced mixing and higher capture probability. The gas hold-up in the multi-stage loop column is higher, thus affording greater opportunity for contacts between gas bubbles and suspended liquid droplets or fine solid particles. Furthermore, the special gas sparger utilized produces very fine gas bubbles which are essential for high probability of attachment of the gas bubbles to suspended liquid droplets or fine solid particles. Finally, the simple construction provides improved overall separation efficiency at low operation cost.

FIG. 3 illustrates an alternative embodiment of the invention which includes agitation and vortex inducing plates in the multi-stage flotation column with draft tubes. As noted hereinabove, known, conventional froth flotation apparatus has included mechanical mixing or agitation to enhance system operation, even though mixing is energy intensive. In the present invention as shown in FIG. 3, an agitator may be included in the form of a motor 80 which drives an elongated agitator shaft 82 in rotation. Shaft 82 extends coaxially through the multiple stages of the flotation column, and coaxially through the serially arranged draft tubes 24, 26, 28, to thereby drive agitator impellers 84, preferably a plurality of such impellers, disposed in each of the draft tubes. For example, three axially spaced impellers 84 may be disposed in each draft tube as shown, although other arrangements of agitators are possible. The agitation provided by impellers 84, working in conjunction with operation of the froth flotation apparatus as hereinabove described, can provide a further enhanced froth flotation process, depending upon which of the various system operational characteristics one may wish to optimize.

FIG. 3 also illustrates a further modification in the form of vortex inducing plates 86 disposed atop one or more of the draft tubes 24, 26 and 28 to induce vortex flow in the fluid passing upwardly through the respective draft tubes. Each vortex inducing plate 86 has several radially slotted openings 87 which direct the upward flow issued from the draft tubes 24, 26 and 28 in a circular motion. The flow proceed upward as described hereinabove and through slots 87, impinging on vanes 89 which project upwardly from the plane of slots 87. The induced circular motion, i.e., vortex flow, enhances the separation of heavy droplets or particles from water by centrifugal force which causes heavy droplets or particles to move toward the column wall 11 and then sink to the bottom of the column 10.

The following examples, which are derived from experiments conducted in the above described apparatus, are included to illustrate the operative capability of the present invention. While the invention has been described with particular reference to treatment of oily waste water in the following examples, it is also effective in removing suspended fine particles from water as well as in solid-solid separation for mineral beneficiation.

EXAMPLE 1

Experimental results for removal of oil from oily waste water using the multi-stage loop flotation column of this invention column of this invention, carried out in a batch operation mode on an emulsified oil-water sample containing 435 ppm oil. Sodium dodecyl sulfate at a concentration of 10 ppm was used as a surfactant. Model waste water was prepared by adding 0.5 cubic centimeters of light mineral oil (density: 874 kg/cubic meter) into 1000 cubic centimeters of water and then emulsifying them in a Waring Blender at a speed of 13,500 rpm for 20 seconds. The total volume of model waste water treated in each batch operation was 11 liters. A predetermined amount of surfactant was added to the water prior to mixing. Clean water samples were collected during the floatation process, and the oil content in the samples was analyzed chromatographically. The experiments were conducted at room temperature. The result are shown in Table 1 below.

TABLE 1

| Flotation Duration (min.) | Oil Concentration (ppm) |
|---|---|
| 0 | 435 |
| 6 | 150 |
| 12 | 85 |
| 18 | 50 |
| 24 | 31 |
| 30 | 20 |

From these results, it can be seen that the invention is capable of yielding excellent separation of oil from oily waste water.

EXAMPLE 2

This example provides a comparison between the conventional flotation column and the multi-stage loop flotation column of this invention in terms of oil separation efficiency. The separation efficiency is defined by the ratio of the change in the oil concentration in water to the initial oil concentration in water. The experiments were conducted at room temperature on an emulsified oil-water sample containing 435 ppm oil. All of the operating conditions were the same as for Example 1. The results, shown in Table 2 below, clearly demonstrate the superior performance of the multi-stage loop flotation column of the present invention as compared with the conventional flotation column.

TABLE 2

| Flotation Duration(min) | Conventional Flotation Column | Single-Stage Flotation Column | Two-Stage Flotation Column | Three-Stage Flotation Column |
|---|---|---|---|---|
| 0 | 0 | 0 | 0 | 0 |
| 6 | 10 | 51 | 65 | 93 |
| 12 | 37 | 65 | 80 | 96 |
| 18 | 55 | 78 | 88 | 98 |
| 24 | 77 | 87 | 93 | 98+ |
| 30 | 82 | 90 | 95+ | 98+ |

Although we have described our invention with reference to certain presently preferred embodiments, it is to be appreciated that we have envisioned various alternative and modified embodiments as well. Accordingly, it is intended that the invention should be construed as broadly as permitted by the scope of the claims appended hereto.

We claim:

1. In a froth flotation apparatus for processing a waste fluid by froth flotation, the combination comprising:

an elongated flotation column having defined therein a flotation chamber;

a plurality of elongated flotation chamber stages arranged longitudinally adjacent each other within said flotation chamber;

open-ended draft tube means disposed coaxially within each of said stages for creating loop flow of waste fluid within the respective said stages;

a space extending longitudinally intermediate said draft tube means in each pair of longitudinally adjacent said stages to separate said longitudinally adjacent stages from one another;

inlet means for directing waste fluid into said flotation chamber;

means for generating fine bubbles and for introducing said fine bubbles into said flotation chamber to be mixed with waste fluid in said flotation chamber for processing of such waste fluid;

outlet means for conveying processed waste fluid from said flotation chamber; and a froth overflow launder for receiving froth overflow from said flotation chamber and means for conveying froth overflow away from said froth overflow launder.

2. The combination as set forth in claim 1 wherein said flotation chamber is a generally cylindrical chamber.

3. The combination as set forth in claim 1 wherein adjacent ones of said plurality of stages are further separated from one another by intervening baffles disposed within said spaces, respectively, at least one of said baffles being disposed in a manner to provide an open space between said at least one of said baffles and the laterally adjacent periphery of said flotation chamber.

4. The combination as set forth in claim 3 wherein at least a pair of said individual stages are generally cylindrical stages arranged coaxially with respect to one another and said baffles are generally open-ended cone-shape baffles disposed generally coaxially with respect to said cylindrical stages.

5. The combination as set forth in claim 1 further including vortex inducing means disposed coaxially adjacent one end of at least one of said draft tube means.

6. The combination as set forth in claim 1 further including agitator means disposed within at least one of said draft tube means.

7. The combination as set forth in claim 1 wherein said draft tube means and the respective said stages are cylindrical, and the ratio of the diameter of said draft tube means to the inside diameter of the respective said stages is the range of 0.2 to 0.9.

8. The combination as set forth in claim 1 wherein the ratio of the diameter of said draft tube means to the inside diameter of the respective said stages is in the range of 0.2 to 0.9.

9. The combination as set forth in claim 1 wherein said overflow froth launder is disposed adjacent an upper end portion of said flotation column and in laterally surrounding relationship with respect to said flotation column.

10. The combination as set forth in claim 9 wherein said overflow froth launder includes an outer cylindrical wall extending circumferentially about said flotation column and spaced radially outwardly thereof, and an inclined bottom plate.

11. The combination as set forth in claim 1 wherein said means for generating fine bubbles is disposed adjacent a lower end portion of said flotation chamber.

12. The combination as set forth in claim 11 wherein said means for generating fine bubbles includes a porous body having a pore size suitable for producing gas bubbles in a size range of about 20 microns to about 500 microns diameter.

13. The combination as set forth in claim 12 wherein the pore size of said porous body is preferably about 5–25 microns.

14. In a flotation apparatus for processing waste fluid by froth flotation, the combination comprising:

an elongated, upstanding flotation column;

a froth overflow launder disposed adjacent an upper end portion of said flotation column;

a flotation chamber defined within said flotation column;

said flotation chamber comprising a plurality of axially adjacent, elongated flotation chamber stages;

a plurality of open-ended draft tube means disposed within said plurality of flotation chamber stages, respectively;

a space extending longitudinally intermediate each pair of said draft tube means in said axially adjacent said stages to separate said axially adjacent stages from one another;

said stages being arranged such that waste fluid flow is directed sequentially through said plurality of flotation chamber stages;

an inlet means for directing waste fluid into said flotation chamber and an outlet means for conveying processed waste fluid from said flotation chamber;

means cooperable with said draft tube means for directing waste fluid flow through said flotation chamber in a manner to produce circulating flow of the waste fluid within each of said plurality of flotation chamber stages, the circulating flow passing upwardly within said draft tube means and downwardly within the respective said flotation chamber stage outside of said draft tube means; and means for introducing gas bubbles into the taste fluid within said flotation chamber to mix therewith during said circulating flow thereof.

15. The apparatus as set forth in claim 14 wherein said draft tube means and said flotation chamber are cylindrical, and the ratio of the diameter of said draft tube means to the inside diameter of said flotation chamber is the range of 0.2 to 0.9.

16. The apparatus as set forth in claim 14 wherein said means for introducing gas bubbles into the waste fluid includes a sparger means disposed adjacent a lower end portion of said flotation chamber.

17. The apparatus as set forth in claim 16 wherein said sparger means includes a porous body having a pore size suitable for producing gas bubbles in a size range of about 20 microns to about 500 microns diameter.

18. The apparatus as set forth in claim 17 wherein the pore size of said porous body is preferably about 5–25 microns.

19. The apparatus as set forth in claim 14 additionally including vortex inducing means which is cooperable with said draft tube means to produce a vortex flow within said circulating flow of waste fluid.

20. The apparatus as set forth in claim 14 additionally including agitator means which is cooperable with said draft tube means to agitate said circulating flow of water fluid therein.

21. The apparatus as set forth in claim 14 wherein said circulating flow is axially symmetric flow with respect to the central longitudinal axis of said draft tube means.

22. The apparatus as set forth in claim 14 wherein adjacent ones of said plurality of stages are further separated from one another by intervening baffles, at least one of said baffles being disposed in a manner to provide an open space between said one of said baffles and the laterally adjacent periphery of said flotation chamber.

\* \* \* \* \*